(12) United States Patent
Nakamata et al.

(10) Patent No.: US 8,565,195 B2
(45) Date of Patent: Oct. 22, 2013

(54) APPARATUS, METHODS AND COMPUTER PROGRAM PRODUCTS PROVIDING SUPPORT FOR PACKET DATA USER CONTINUOUS UPLINK CONNECTIVITY

(75) Inventors: Masatoshi Nakamata, Kanagawa (JP); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 1622 days.

(21) Appl. No.: 11/894,193

(22) Filed: Aug. 20, 2007

(65) Prior Publication Data

US 2008/0049683 A1 Feb. 28, 2008

Related U.S. Application Data

(60) Provisional application No. 60/839,400, filed on Aug. 21, 2006.

(51) Int. Cl.
*H04B 7/216* (2006.01)
*H04L 12/28* (2006.01)

(52) U.S. Cl.
USPC ............................ 370/335; 370/342; 370/401

(58) Field of Classification Search
USPC ...................................................... 370/335
See application file for complete search history.

(56) References Cited

U.S. PATENT DOCUMENTS

| | | | | |
|---|---|---|---|---|
| 6,724,742 | B1 * | 4/2004 | Mun et al. | 370/335 |
| 6,747,963 | B1 * | 6/2004 | Park et al. | 370/335 |
| 7,006,482 | B1 * | 2/2006 | Choi et al. | 370/342 |
| 7,085,254 | B1 * | 8/2006 | Yun et al. | 370/342 |
| 2002/0080806 | A1 * | 6/2002 | Haggard Ljungqvist | 370/401 |
| 2002/0082020 | A1 | 6/2002 | Lee et al. | |
| 2004/0047328 | A1 * | 3/2004 | Proctor et al. | 370/342 |
| 2006/0203782 | A1 * | 9/2006 | Kwak et al. | 370/335 |

FOREIGN PATENT DOCUMENTS

| | | |
|---|---|---|
| CN | 1300474 A | 6/2001 |
| WO | WO 00/62435 | 10/2000 |

OTHER PUBLICATIONS

3GPP TR 25.903 v1.0.0 (May 2006), "3$^{rd}$ Generation Partnershp Project; Technical Specification Group Radio Access Network; Continuous Connectivity for Packet Data Users; (Release 7) Section 4.2.1.4", 4 pgs.
3GPP TR 25.903 V1.0.0 (May 2006), "3$^{rd}$ Generation Partnership Project; Technical Specification Group Radio Access Network; Continuous Connectivity for Packet Data Users: (Release 7)", pp. 1-104.

(Continued)

*Primary Examiner* — Brandon Renner
(74) *Attorney, Agent, or Firm* — Harrington & Smith

(57) ABSTRACT

The exemplary embodiments of this invention include apparatus, methods and computer program products that provide a signaling scheme that enables the execution of an uplink gating feature. In one non-limiting, exemplary embodiment, the signaling scheme is an Iub/Iur signaling scheme and the uplink gating feature is an uplink dedicated physical control channel (DPCCH) gating feature, for example, as may be utilized within a wideband code divisional multiple access (WCDMA) communication network. In one non-limiting, exemplary embodiment, a method includes: sending a first message from a base station towards a network element in a communications network, wherein the first message includes a first parameter that is indicative of a capability for supporting uplink gating in a cell under the base station; and sending a second message from the network element towards the base station, wherein the second message includes an instruction for uplink gating in the cell.

33 Claims, 7 Drawing Sheets

(56) References Cited

OTHER PUBLICATIONS

3GPP TS 25.423 V6.8.0 (Dec. 2005), "3$^{rd}$ Generation Partnership Project; Technical Specification Group Radio Access Network; UTRAN Iur interface RNSAP signalling (Release 6)."

3GPP TS 25.433 (V6.8.0 (Dec. 2005), "3$^{rd}$ Generation Partnership Project; Technical Specification Group Radio Access Network; UTRAN Iub interface Node B Application Part (NBAP) signaling (Release 6)."

3GPP TS 25.423 V6.10.0 (Jun. 2006), "3$^{rd}$ Generation Partnership Project; Technical Specification Group Radio Access Network; UTRAN Iur interface Radio Network Subsystem Application Part (RNSAP) signaling (Release 6)."

3GPP TS 25.433 V6.10.0 (Jun. 2006), "3$^{rd}$ Generation Partnership Project; Technical Specification Group Radio Access Network; UTRAN Iub interface Node B Application Part (NBAP) signaling (Release 6)."

ETSI TS 125 401 V7.0.0 (Mar. 2006), "Universal Mobile Telecommunications System (UMTS); UTRAN overall description (3GPP TS 25.401 version 7.0.0 Release 7)," pp. 1-49.

3GPP TR 25.903 V7.0.0 (Mar. 2007), "3$^{rd}$ Generation Partnership Project; Technical Specification Group Radio Access Network; Continuous connectivity for packet data users; (Release 7)."

3GPP TS 25.423 V7.5.0 (Jun. 2007), "3$^{rd}$ Generation Partnership Project; Technical Specification Group Radio Access Network; UTRAN Iur interface RNSAP signaling (Release 7)."

3GPP TS 25.433 V7.5.0 (Jun. 2007), "3$^{rd}$ Generation Partnershp Project; Technical Specification Group Radio Access Network; UTRAN Iub interface Node B Application Part (NBAP) signaling (Release 7)."

\* cited by examiner

| IE/GROUP NAME | PRESENCE | RANGE | IE TYPE AND REFERENCE | SEMANTICS DESCRIPTION |
|---|---|---|---|---|
| CELL CAPABILITY CONTAINER FDD | | | BIT STRING (32) | EACH BIT INDICATES WHETHER A CELL SUPPORTS A PARTICULAR FUNCTIONALITY OR NOT. THE VALUE 1 OF A BIT INDICATES THAT THE CORRESPONDING FUNCTIONALITY IS SUPPORTED IN A CELL AND VALUE 0 INDICATES THAT THE CORRESPONDING FUNCTIONALITY IS NOT SUPPORTED IN A CELL. EACH BIT IS DEFINED AS FOLLOWS. THE FIRST BIT: RESERVED. THE SECOND BIT: DELAYED ACTIVATION SUPPORT INDICATOR. THE THIRD BIT: HS-DSCH SUPPORT INDICATOR. THE FOURTH BIT: RESERVED. THE FIFTH BIT: F-DPCH SUPPORT INDICATOR. THE SIXTH BIT: E-DCH SUPPORT INDICATOR. THE SEVENTH BIT: E-DCH TTI2ms SUPPORT INDICATOR. THE EIGHTH BIT: E-DCH 2sf2and2sf4 AND ALL INFERIOR SFs SUPPORT INDICATOR. THE NINTH BIT: E-DCH 2sf2 AND ALL INFERIOR SFs SUPPORT INDICATOR. THE TENTH BIT: E-DCH 2sf4 AND ALL INFERIOR SFs SUPPORT INDICATOR. THE ELEVENTH BIT: E-DCH sf4 AND ALL INFERIOR SFs SUPPORT INDICATOR. THE TWELVETH BIT: E-DCH sf8 AND ALL INFERIOR SFs SUPPORT INDICATOR. THE THIRTEENTH BIT: E-DCH HARQ IR COMBINING SUPPORT INDICATOR THE FOURTEENTH BIT: E-DCH HARQ CHASE COMBINING SUPPORT INDICATOR THE XXTH BIT: UPLINK DPCCH GATING SUPPORT INDICATOR. NOTE THAT UNDEFINED BITS ARE CONSIDERED AS A SPARE BIT AND SPARE BITS SHALL BE SET TO 0 BY THE TRANSMITTER AND SHALL BE IGNORED BY THE RECEIVER. NOTE THAT RESERVED BITS ARE NOT CONSIDERED AS A SPARE BIT. THEY SHALL HOWEVER BE SET 0 BY THE TRANSMITTER AND SHALL BE IGNORED BY THE RECEIVER. |

FIG.3

APPARATUS, METHODS AND COMPUTER PROGRAM PRODUCTS PROVIDING SUPPORT FOR PACKET DATA USER CONTINUOUS UPLINK CONNECTIVITY

CROSS-REFERENCE TO RELATED APPLICATIONS

This patent application claims priority under 35 U.S.C. §119(e) from Provisional Patent Application No. 60/839,400, filed Aug. 21, 2006, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques to provide inter-device communication in support of uplink continuous connectivity for packet data users.

BACKGROUND

The following abbreviations are defined as follows.
3GPP 3rd Generation Partnership Project
ACK acknowledged
CN core network
CRNC controlling RNC
CQI channel quality indicator
DCH dedicated channel
DL downlink
E-DCH enhanced UL DCH
DPCCH dedicated physical control channel
DRNC drifting RNC
F-DPCH fractional DPCH
FDD frequency division duplex
HARQ hybrid automatic repeat request
HS—high speed
IE information element
NACK not acknowledged
NBAP Node B application part
Node B base station
PDSCH physical downlink shared channel
RAN radio access network
RNC radio network controller
RNSAP radio network subsystem application part
SCCH shared control channel
SIR signal-to-interference ratio
SRNC serving RNC
TGL transmission gap length
TGPL transmission gap pattern length
TPC transmit power control
TTI transmission time interval
UE user equipment
UL uplink
VoIP voice over internet protocol
WCDMA wideband code divisional multiple access Of particular interest to the exemplary embodiments of the invention described below is 3GPP WCDMA radio access, more specifically an aspect thereof proposed in 3GPP TR 25.903 V1.0.0 (2006-05), "3rd Generation Partnership Project; Technical Specification Group Radio Access Network; Continuous Connectivity for Packet Data Users; (Release 7)," at least in Section 4.2.

Section 4.2 of this document, entitled "Uplink DPCCH Gating", describes the concept as applying to a HSDPA/HSUPA scenario only, with no DCHs configured in either direction. The uplink TPC commands sent in the downlink are assumed to be carried over F-DPCH, but one could use the associated DPCCH as well.

With regard to the general principle, it is said that the optimal solution for reducing DPCCH overhead of packet data users is turning off the DPCCH transmission when no data or HS-DPCCH is being transmitted. With such an ideal solution the idle packet data users would not consume any uplink air interface resources and the network resource allocation would set the limit on how many idle users could be kept in the CELL_DCH state. However, due to practical reasons there may be a limit on the length of the DPCCH gating period, as during a period of long UE inactivity the Node B would not know whether the uplink UE synchronization was lost, or if there is just a long inactivity period.

The basic principle is that if there is neither an E-DCH or HS-DPCCH transmission, the UE automatically stops the continuous DPCCH transmission and instead applies a known DPCCH activity (DPCCH on/off) pattern (i.e., a gating pattern). When an E-DCH or HS-DPCCH transmission takes place the DPCCH is also transmitted regardless of the activity pattern.

That is, during a period of E-DCH and HS-DPCCH inactivity the UE would activate a known DPCCH transmission pattern (i.e., a gating pattern), such as a few DPCCH slots transmitted every few radio frames, and no DPCCH transmission is made during other times. If E-DCH or HS-DPCCH is transmitted the DPCCH would be transmitted normally regardless of the pattern. Depending on the length of the DPCCH transmission gap, a DPCCH power control preamble of a few slots may be needed before E-DCH/HS-DPCCH transmission may start. Reception of the downlink HS-SCCH/HS-PDSCH would be active and possible at all times for the UE. During the periods when the UL DPCCH is not transmitted, the Node B will not be able to perform UL SIR estimation, and thus has no information on which to base the UL TPC commands sent on F-DPCH. Therefore, the F-DPCH should also be gated during the periods of UL DPCCH gating.

The above-described operations illustrate what may generally be referred to as gating and, in particular, uplink gating (i.e., gating of one or more uplink signals) in accordance with a gating pattern.

With regard to a basic packet traffic example, Figure 4.2.1.2-1 of 3GPP TR 25.903, shown herein as FIG. 1A, depicts the basic concept, where during data traffic activity (e.g., a web page is being transmitted in the downlink and TCP acknowledgments, as well as HSDPA acknowledgments are transmitted in the uplink) operation is in accordance with Release 6 specifications. When the data traffic stops, the continuous DPCCH transmission in the uplink is shut down as well. Occasionally during the period of data inactivity the DPCCH is transmitted in a predetermined pattern so that the Node B always knows to expect some slots of DPCCH transmission, and can thus still follow the uplink UE presence and quality.

Whenever the uplink has something to transmit on the E-DCH or the HS-DPCCH the DPCCH transmission will be automatically reinitiated.

More generally, during any packet session with any packet activity/inactivity ratio, when the user is transmitting data in the uplink, the DPCCH is continuously active as long as the data or HS-DPCCH transmission is taking place and, during the 'reading time', when the uplink is inactive, the DPCCH gating pattern would be applied, thereby reducing the consumed uplink capacity to a fraction of that required if a continuous DPCCH were used. In addition, due to the reduced uplink capacity consumption the UE talk times would be increased because of the reduced battery consumption. The actual savings would be heavily dependent on the activity factor of the uplink transmission, as well as on the amount of time allowed before dropping inactive users from the CELL_DCH.

With VoIP it would also be possible to benefit from the fact that the data transmission timing, even during the active phase of VoIP, would be known and could be matched with the DPCCH gating period. During the active speech phase the UE would transmit the VoIP packet transmissions and retransmissions with DPCCH, and between the packets DPCCH would not be transmitted.

Figure 4.2.1.3-1 of 3GPP TR 25.903, shown herein as FIG. 1B, illustrates an exemplary DPCCH transmission with gating, a 2 ms E-DCH TTI and VoIP traffic (with an average transmission rate of 2.5 transmission per packet) mapped to HARQ processes 1 and 2. Also shown is the DPCCH activity pattern during E-DCH inactivity as a 2 ms burst every 32 ms. Note that this is a simplified example, and that the transmissions and retransmissions do not need to follow this regular pattern in order to obtain the desired benefits from the DPCCH gating. With such parameterization the DPCCH overhead would be reduced to ~6% during voice inactivity and to ~25% during voice activity. Assuming 50% voice activity the DPCCH overhead would be reduced to ~16% of the overhead from continuous DPCCH. HS-DPCCH activity and possible power control preambles would reduce the actual gains, but with good parameterization and possible improvements to CQI reporting, the impact of HS-DPCCH is not dominant.

Figure 4.2.1.3-2 3GPP TR 25.903, shown herein as FIG. 1C, illustrates an exemplary DPCCH transmission with gating and 10 ms E-DCH TTI, and VoIP traffic (no retransmissions shown, low retransmission rate) mapped to HARQ processes 1 and 3. Also shown is the DPCCH activity pattern during E-DCH inactivity as a 2 ms burst every 20 ms. With such parameterization the DPCCH overhead would be reduced to 10% during voice inactivity and to ~50% during voice activity. Assuming 50% voice activity the DPCCH overhead would be reduced to ~30% of the overhead from continuous DPCCH. HS-DPCCH activity and potential power control preambles would reduce the actual gains.

With regard to the operation of the uplink DPCCH gating, the RNC would control the activation and deactivation of the Uplink DPCCH Gating feature in the same manner that the RNC controls the Preamble/Postamble transmission for HSDPA ACK/NACK transmission. This is said in 3GPP TR 25.903 to be essential in order to guarantee the functionality in the SHO, as gating can be used only if all Node B's in the active set support it. The RNC should also decide what kind of gating parameters would be used, and signal the information to the Node B(s) and UE. If a Node B in the UE's active set does not support gating the RNC must disable the Uplink DPCCH Gating.

When the Uplink DPCCH Gating feature is enabled by the RNC the UE would transmit the DPCCH continuously when E-DCH or HS-DPCCH is transmitted, and transmit the DPCCH discontinuously during the inactivity of E-DCH and HS-DPCCH according to parameters provided by the RNC.

Additional 3GPP specifications of interest include 3GPP TS 25.423 and 25.433, more specifically: 3GPP TS 25.423 V6.8.0 (2005-12), "3rd Generation Partnership Project; Technical Specification Group Radio Access Network; UTRAN Iur interface RNSAP signalling (Release 6)," and 3GPP TS 25.433 V6.8.0 (2005-12), "3rd Generation Partnership Project; Technical Specification Group Radio Access Network; UTRAN Iub interface Node B Application Part (NBAP) signalling (Release 6)."

As of the filing date of the above-cited provisional application from which priority is claimed, the most recent versions of these two 3GPP specifications are: 3GPP TS 25.423 V6.10.0 (2006-06), "3rd Generation Partnership Project; Technical Specification Group Radio Access Network; UTRAN Iur interface Radio Network Subsystem Application Part (RNSAP) signalling (Release 6)," and 3GPP TS 25.433 V6.10.0 (2006-06), "3rd Generation Partnership Project; Technical Specification Group Radio Access Network; UTRAN Iub interface Node B Application Part (NBAP) signalling (Release 6)."

The inventors have realized that the execution of the uplink DPCCH Gating feature as described above in reference to 3GPP TR 25.903 is not possible with the Iub/Iur signaling as defined in accordance with the current 3GPP specifications.

SUMMARY

In an exemplary aspect of the invention, a method includes: receiving a first message from a network element in a communications network, wherein the first message includes a first parameter that is indicative of a capability for supporting uplink gating in a cell under a base station in the communications network; and sending a second message to the network element including an instruction for uplink gating in the cell.

In another exemplary aspect, an electronic device includes: a data processor configured to receive a first message from a network element in a communication network, wherein the first message includes a first parameter that is indicative of a capability for supporting uplink gating in a cell under a base station in the communications network; and a memory configured to store the first parameter, wherein the data processor is further configured to send a second message to the network element, wherein the second message includes an instruction for uplink gating in the cell.

In a further exemplary aspect, an electronic device includes: means for receiving a first message from a network element in a communication network, wherein the first message includes a first parameter that is indicative of a capability for supporting uplink gating in a cell under a base station in the communications network; and means for sending a second message to the network element, wherein the second message includes an instruction for uplink gating in the cell.

In another exemplary aspect, a method includes: determining a capability of a cell under a base station in a communications network to support uplink gating; and sending a message to a network element in the communications network, wherein the message includes a first parameter comprising a positive or negative indication of the capability.

In a further exemplary aspect, an electronic device includes: a data processor configured to determine a capability of a cell under a base station in a communications network to support uplink gating; and a memory configured to store the first parameter, wherein the data processor is further configured to send a message to a network element in the communications network, wherein the message includes a first parameter comprising a positive or negative indication of the capability.

In another exemplary aspect, an electronic device includes: means for determining a capability of a cell under a base station in a communications network to support uplink gating; and means for sending a message to a network element in the communications network, wherein the message includes a first parameter comprising a positive or negative indication of the capability.

In a further exemplary aspect, a method includes: sending a first message from a base station towards a network element in a communications network, wherein the first message includes a first parameter that is indicative of a capability for supporting uplink gating in a cell under the base station; and sending a second message from the network element towards the base station, wherein the second message includes an instruction for uplink gating in the cell.

In another exemplary aspect, a communications network includes: a network element; and a base station configured to send towards the network element a first message including a first parameter that is indicative of a capability for supporting uplink gating in a cell under the base station, wherein the network element is configured to send towards the base station a second message including an instruction for uplink gating in the cell.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 3 shows an exemplary Cell Capability Container FDD that is modified so as to include an Uplink DPCCH Gating Support Indicator for use with RNSAP Iur signaling in accordance with exemplary embodiments of this invention;

DETAILED DESCRIPTION

Figure 1A:
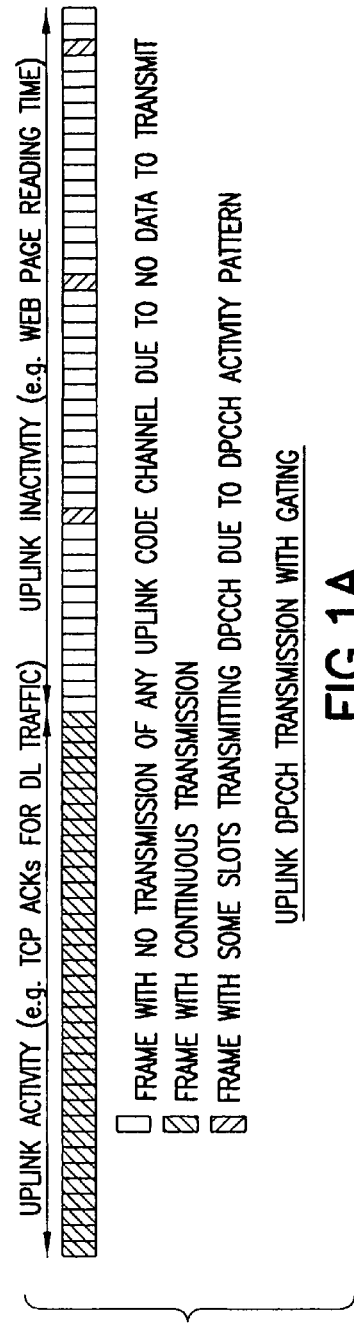
FIG. 1A reproduces Figure 4.2.1.2-1 of 3GPP TR 25.903.
Figure 1B:
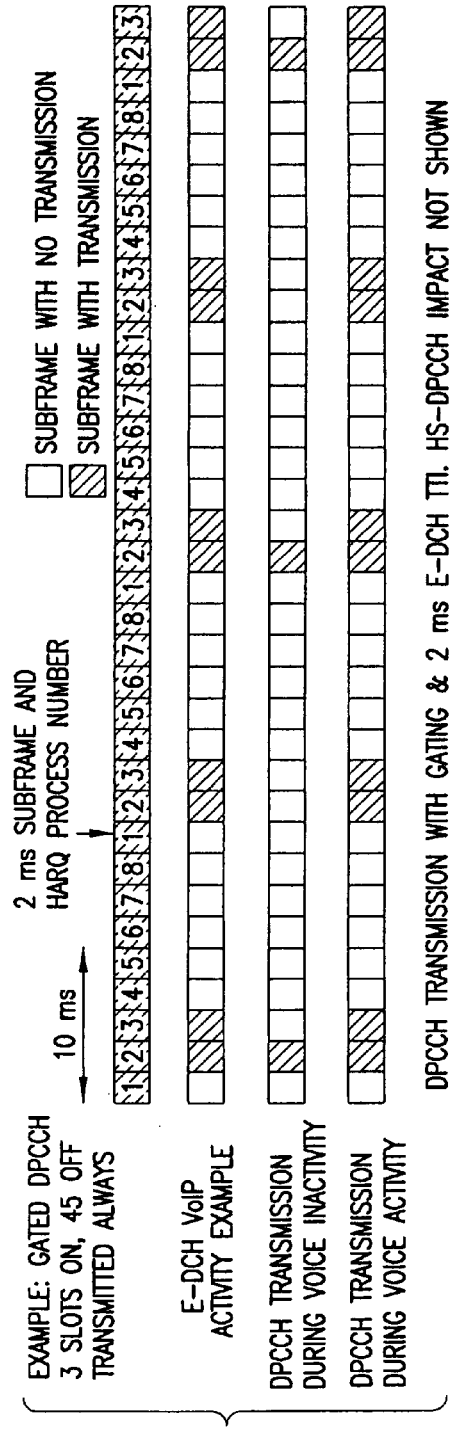
FIG. 1B reproduces Figure 4.2.1.2-2 of 3GPP TR 25.903.
Figure 1C:
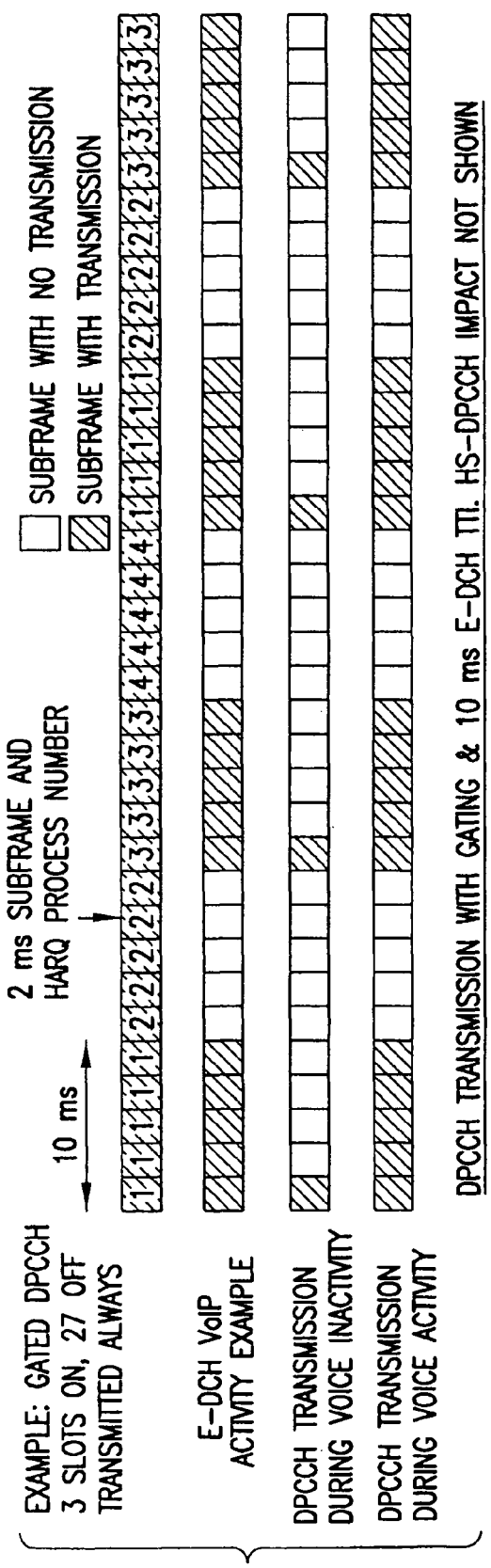
FIG. 1C reproduces Figure 4.2.1.2-3 of 3GPP TR 25.903.
Figure 2:
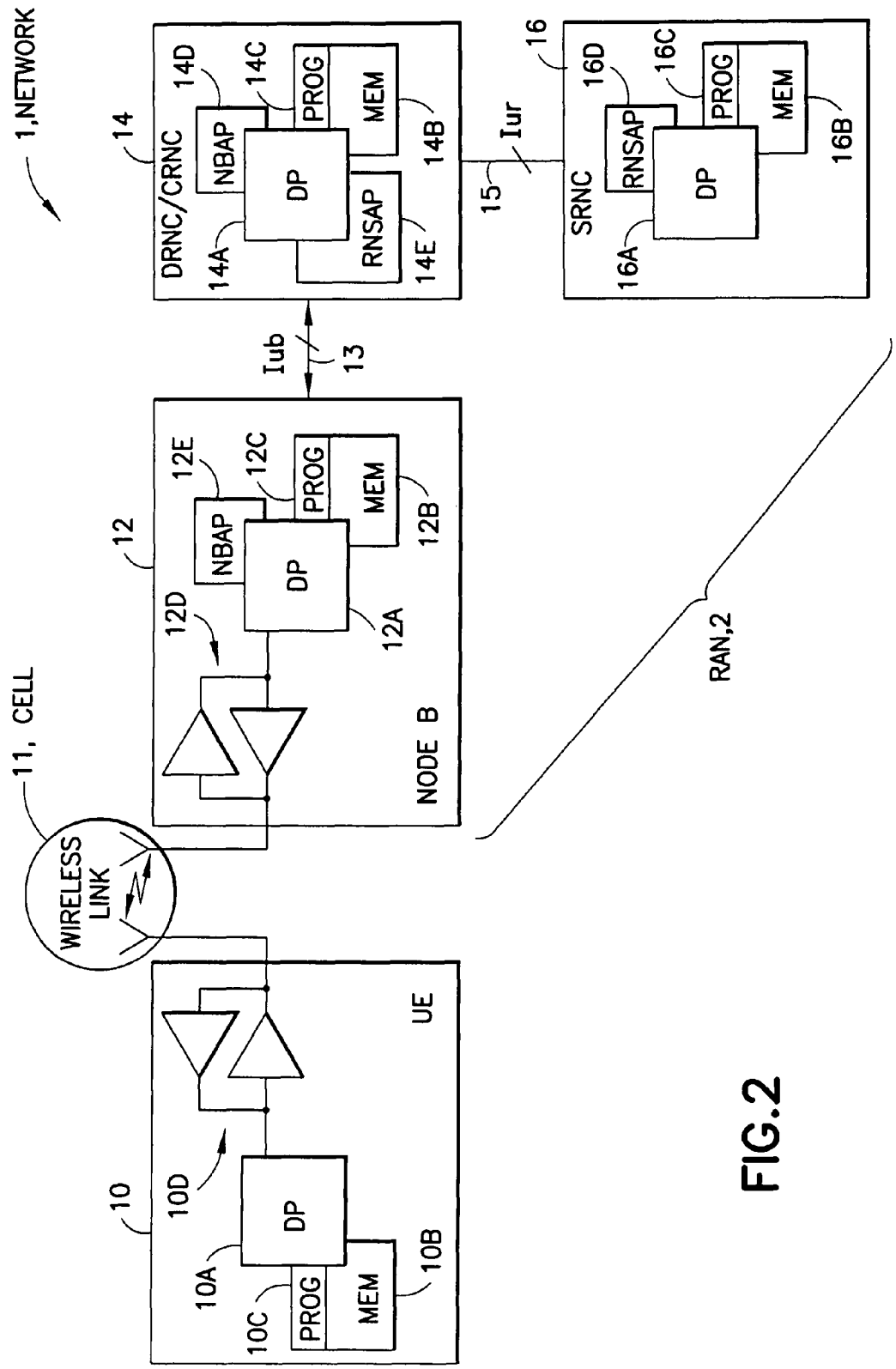
FIG. 2 shows a simplified block diagram of various exemplary electronic devices that are suitable for use in practicing the exemplary embodiments of this invention.
Figure 6:
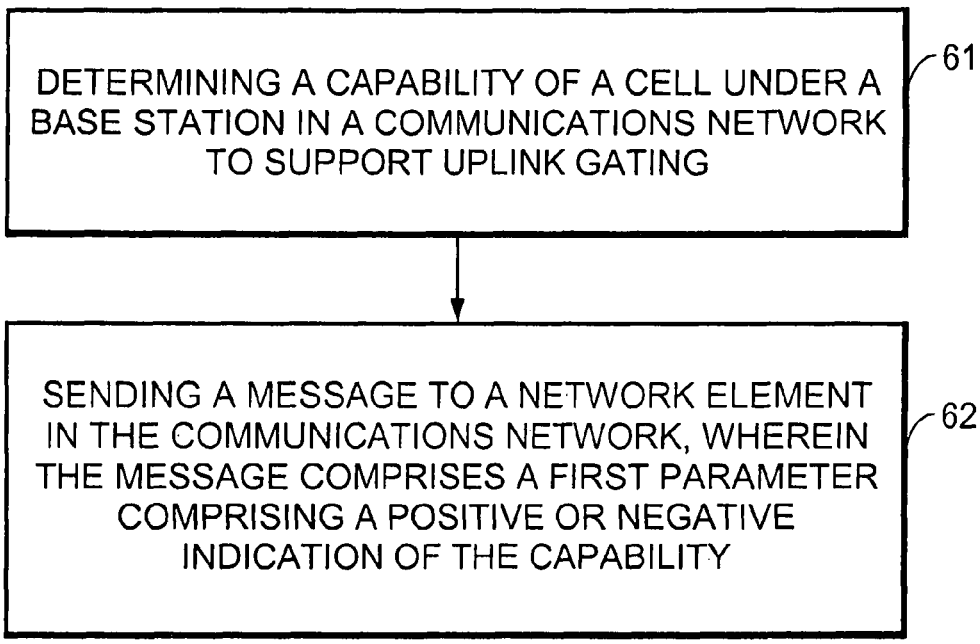
FIG. 6 depicts a flowchart illustrating another non-limiting example of a method for practicing the exemplary embodiments of this invention.

Reference is made first to FIG. 2 for illustrating a simplified block diagram of various electronic devices that are suitable for use in practicing the exemplary embodiments of this invention. In FIG. 2 an exemplary wireless network 1 is adapted for communication with a UE 10 via a Node B (base station) 12. The network 1 includes a RAN 2 that is comprised of a plurality of network elements (NEs). One NE may be referred to as an RNC, and more specifically may be referred to as a DRNC/CRNC 14. Another NE may be a SRNC 16. The DRNC/CRNC 14 is coupled to the Node B 12 via an Iub interface 13, and is further coupled to the SRNC via an Iur interface 15. Reference may be had to ETSI TS 125 401 V7.0.0 (2006-03), Universal Mobile Telecommunications System (UMTS); UTRAN overall description (3GPP TS 25.401 version 7.0.0 Release 7 for an overall description of the architecture of the network 1 (such as is shown in FIG. 6 (Protocol Layering) of 3GPP TS 25.401).

The UE 10 includes a data processor (DP) 10A, a memory (MEM) 10B that stores a program (PROG) 10C, and a suitable radio frequency (RF) transceiver 10D for bidirectional wireless communications with the Node B 12 when in a cell 11 that is associated with the Node B 12. The Node B 12 also includes a DP 12A, a MEM 12B that stores a PROG 12C, and a suitable RF transceiver 12D. The Node B 12 is coupled via the Iub interface 13 to the DRNC/CRNC 14 that also includes a DP 14A and a MEM 14B storing an associated PROG 14C. The Node B 12 is coupled via the Iub interface 13 to the DRNC/CRNC 14 that also includes a DP 14A and a MEM 14B storing an associated PROG 14C. The DRNC/CRNC 14 is coupled via the Iur interface 15 to the SRNC 16 that also includes a DP 16A and a MEM 16B storing an associated PROG 16C.

The Node B 12 is shown to include a NBAP 12E, the DRNC/CRNC 14 is also shown to include a NBAP 14D as well as a RNSAP 14E, and the SRNC 16 is shown to include a RNSAP 16D. The elements may be implemented as hardware, software, or as a combination of hardware and software. As such, certain of the PROGs 12C, 14C, 16C are assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the other DPs, or by hardware, or by a combination of software and hardware.

The MEMs 10B, 12B, 14B and 16B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, 14A and 16A may be of any type suitable to the local technical environment, and may include one or more of general purpose computers, special purpose computers, microprocessors, digital signal processors (DSPs) and processors based on a multi-core processor architecture, as non-limiting examples.

Although depicted in FIG. 2 as having a DRNC/CRNC 14, in other exemplary embodiments the RAN 2 may not include such a NE. In that exemplary embodiment, the Node B 12 may communicate with the SRNC 16 via the Iub interface 13. In other exemplary embodiments, the RAN 2 may comprise additional or different NEs. It is noted that the exemplary embodiments of the invention, as further explained below, may be implemented by any suitable network element or a plurality of suitable network elements. The discussion herein with respect to the Node B 12, the DRNC/CRNC 14 and the SRNC 16 is presented for illustration purposes as one non-limiting, exemplary embodiment.

It is noted that as of the filing date of this nonprovisional application the most recent version of 3GPP TR 25.903 is 3GPP TR 25.903 V7.0.0 (2007-03), "3rd Generation Partnership Project; Technical Specification Group Radio Access Network; Continuous connectivity for packet data users; (Release 7)." It is further noted that as of the filing date of this nonprovisional application, the most recent versions of 3GPP TS 25.423 and 3GPP TS 25.433 are: 3GPP TS 25.423 V7.5.0 (2007-06), "3rd Generation Partnership Project; Technical Specification Group Radio Access Network; UTRAN Iur interface RNSAP signalling (Release 7)," and 3GPP TS 25.433 V7.5.0 (2007-06), "3rd Generation Partnership Project; Technical Specification Group Radio Access Network; UTRAN Iub interface Node B Application Part (NBAP) signalling (Release 7)."

The exemplary embodiments of this invention provide a solution to at least the problem noted above, and beneficially provide a signaling scheme that enables the execution of the uplink gating feature. The exemplary embodiments of this invention also provide a solution to at least the problem noted above, and beneficially provide an Iub/Iur signaling (NBAP/RNSAP) scheme that enables the execution of the uplink DPCCH gating feature.

The role of the various RAN 2 network elements in the uplink DPCCH gating is now discussed.

The DRNC/CRNC 14 is assumed to have knowledge of the capability of the cell under the RNC with regard to the uplink DPCCH gating feature. The SRNC 16 is assumed to have knowledge of the capability of the UE 10. The SRNC 16 is also assumed to make the decision as to whether to execute the uplink DPCCH gating feature (i.e., activation/deactivation of the feature), and to select at least some parameters used for the uplink DPCCH gating feature.

The DRNC/CRNC 14 is assumed to forward the SRNC 16 the cell's capability under the DRNC/CRNC 14, and to forward the Node B 12 a received request from the SRNC 16 to activate/deactivate the uplink DPCCH gating feature.

The Node B 12 is assumed to inform the DRNC/CRNC 14 of the cell's capability, i.e. whether the cell under the Node B 12 supports the uplink DPCCH gating feature, and to control execution of the uplink DPCCH gating feature based on received request from DRNC/CRNC 14.

With regard now to signaling that is associated with the NBAP 12E and 14D, there is provided a first parameter or IE referred to for convenience, and not by way of limitation, as an Uplink DPCCH Gating Capability parameter. This NBAP parameter defines the Uplink DPCCH Gating capability for a local cell (cell 11). The IE type and reference may be: ENUMERATED (Uplink DPCCH Gating Capable, Uplink DPCCH Gating non-Capable). The Uplink DPCCH Gating Capability parameter may be included at least in the following message types: RESOURCE STATUS INDICATION and AUDIT RESPONSE. As a non-limiting example, the first parameter may be referred to as a Continuous Packet Connectivity DTX-DRX Capability parameter, IE or group.

With further regard to signaling that is associated with the NBAP 12E and 14D, there is provided a second parameter or IE referred to for convenience, and not by way of limitation, as an Uplink DPCCH Gating Activation Indicator. This parameter indicates that the Uplink DPCCH Gating is activated or deactivated. The IE type and reference may be: ENUMERATED (Uplink DPCCH Gating Activated, Uplink DPCCH Gating Deactivated). The Uplink DPCCH Gating Activation Indicator may be included in at least in the following message types: RADIO LINK SETUP REQUEST, RADIO LINK ADDITION REQUEST, RADIO LINK RECONFIGURATION PREPARE and RADIO LINK RECONFIGURATION REQUEST. As a non-limiting example, the information corresponding to the second parameter may not need to be expressly signaled. For example, the presence of DTX-DRX information may indicate activated uplink gating. As a further example, the presence of a Choice value: Deactivate under DTX Information to Modify may indicate deactivated uplink gating. As a further non-limiting example, the information corresponding to the second parameter may be signaled implicitly (e.g., based on the presence, absence or value of other related information), as in, for example, a Continuous Packet Connectivity DTX-DRX Information IE or group.

Alternatively, two separate parameters may be provided for separately indicating activation and deactivation, respectively.

With further regard to signaling that is associated with the NBAP 12E and 14D, there is provided a third parameter or IE referred to for convenience, and not by way of limitation, as a Gating Period. The Gating Period parameter defines the length of the gating pattern either in, for example, milliseconds, slots, sub-frames or radio frames, and may be similar to a TGPL IE. As a non-limiting example, the third parameter may be referred to as a UE DTX Cycle parameter, IE or group.

With further regard to signaling that is associated with the NBAP 12E and 14D, there is provided a fourth parameter or IE referred to for convenience, and not by way of limitation, as a Gating Burst Length. This parameter specifies the length of the DPCCH burst in the gating pattern either in, for example, milliseconds, slots or sub-frames, and may be similar to a TGL IE. As a non-limiting example, the fourth parameter may be referred to as a UE DPCCH Burst parameter, IE or group.

With further regard to signaling that is associated with the NBAP 12E and 14D, there is provided a fifth parameter or IE referred to for convenience, and not by way of limitation, as a Gating Preamble Length. This parameter specifies the length of the preamble to be transmitted after the transmission gap and before the actual data transmission, and may be expressed in slots or on/off. Note that if the preamble is not defined then this IE may not be used. As a non-limiting example, the fifth parameter may be referred to as a UE DTX Long Preamble parameter, IE or group.

With further regard to signaling that is associated with the NBAP 12E and 14D, there is provided a sixth parameter or IE referred to for convenience, and not by way of limitation, as a Gating Pattern Offset. This parameters specifies the offset of the start-point of the gating pattern to a starting point of the radio frame, and may be expressed in, for example, slots or sub-frames. It should be noted that this parameter may not be needed if one instead offsets the entirety of the radio link timing, as opposed to just the gating pattern timing. As a non-limiting example, the sixth parameter may be referred to as a UE DTX DRX Offset parameter, IE or group.

With further regard to signaling that is associated with the NBAP 12E and 14D, there is provided a seventh parameter or IE referred to for convenience, and not by way of limitation, as a Gating Power Offset. The Gating Power Offset is used for the first transmitted slot after the gap, relative to the last transmitted slot before the gap (in dB). Note that the use of this parameters may be optional if the power level can be derived directly based on standard specific rules.

With regard now to signaling that is associated with the RNSAP 14E and 16D, there is provided a first parameter or information element (IE) referred to for convenience, and not by way of limitation, as an Uplink DPCCH Gating Support Indicator. This parameter indicates to the SRNC 16 whether the cell 11 under the DRNC/CRNC 14 supports (or does not support) Uplink DPCCH Gating. This parameter may be included in a Cell Capability Container FDD IE.

With further regard to signaling that is associated with the RNSAP 14E and 16D, there is provided a second parameter or IE referred to for convenience, and not by way of limitation, as an Uplink DPCCH Gating Activation Indicator. This parameter indicates whether Uplink DPCCH Gating is activated or deactivated. The IE type and reference may be: ENUMERATED (Uplink DPCCH Gating Activated, Uplink DPCCH Gating Deactivated). The Uplink DPCCH Gating Activation Indicator may be included in at least the following message types: RADIO LINK SETUP REQUEST, RADIO LINK ADDITION REQUEST, RADIO LINK RECONFIGURATION PREPARE and RADIO LINK RECONFIGURATION REQUEST.

Alternatively, two separate parameters may be provided for separately indicating activation and deactivation, respectively.

With further regard to signaling that is associated with the RNSAP 14E and 16D, there are provided third through seventh parameters or IEs referred to for convenience, and not by way of limitation, as the Gating Period, Gating Burst Length, Gating Preamble Length, Gating Pattern Offset and Gating Power Offset. The definitions for these parameters follow the definitions provided above with respect to the NBAP signaling.

As one non-limiting example, an implementation of the Uplink DPCCH Gating Support Indicator for the RNSAP 14E and 16D is as shown in FIG. 3 for a case where the Cell Capability Container FDD is used. The xxth bit (indicating any desired bit number, such as the 15th bit) conveys the Uplink DPCCH Gating Support Indicator that was described above.

Based on the foregoing it should be apparent that the exemplary embodiments of this invention provide a method, apparatus and computer program product(s) to provide radio access network support for enabling a user device to have continuous connectivity for uplink packet data transmissions.

Based on the foregoing it should be apparent that the exemplary embodiments of this invention provide a method, apparatus and computer program product(s) to provide Iub/Iur signaling to support Uplink DPCCH Gating.

Figure 4:
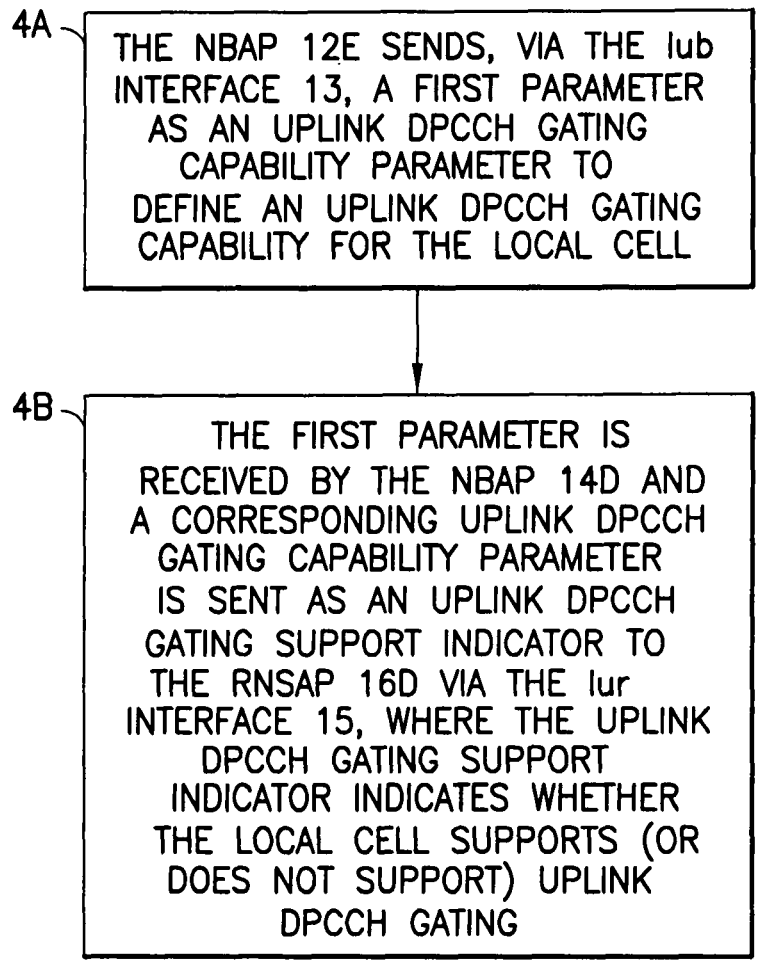
FIG. 4 is a logic flow diagram that is illustrative of an exemplary method in accordance with the exemplary embodiments of this invention.

In accordance with a method, and referring to FIG. 4A, at Step 4A the NBAP 12E sends, via the Iub interface 13, a first parameter as an Uplink DPCCH Gating Capability parameter to define an Uplink DPCCH Gating capability for the local cell 11, and at Step 4B the first parameter is received by the NBAP 14D and a corresponding Uplink DPCCH Gating Capability parameter is sent as an Uplink DPCCH Gating Support Indicator to the RNSAP 16D via the Iur interface 15, where the Uplink DPCCH Gating Support Indicator indicates whether the cell 11 supports (or does not support) Uplink DPCCH Gating. The Uplink DPCCH Gating Support Indicator may be included in a Cell Capability Container FDD IE.

Further in accordance with the method, the operation of Steps 4A and 4B may also send at least one of an Uplink DPCCH Gating Activation Indicator, a Gating Period, a Gating Burst Length, a Gating Preamble Length, a Gating Pattern Offset, and a Gating Power Offset.

In accordance with a computer program product embodiment, a tangible computer-readable storage medium, such as the memories 12B, 14B, stores a program (12C, 14C) the execution of which results in operations of the NBAP 12E sending, via the Iub interface 13, a first parameter as an Uplink DPCCH Gating Capability parameter to define an Uplink DPCCH Gating capability for the local cell 1, and sending a corresponding Uplink DPCCH Gating Capability parameter as an Uplink DPCCH Gating Support Indicator to the RNSAP 16D via the Iur interface 15, where the Uplink DPCCH Gating Support Indicator indicates whether the cell 11 supports (or does not support) Uplink DPCCH Gating. The Uplink DPCCH Gating Support Indicator may be included in a Cell Capability Container FDD IE. Further operations may include sending at least one of an Uplink DPCCH Gating Activation Indicator, a Gating Period, a Gating Burst Length, a Gating Preamble Length, a Gating Pattern Offset, and a Gating Power Offset.

A network device, such as the Node B 12, is constructed in accordance with the exemplary embodiments to include an NBAP having a connection to an Iub interface to send through the Iub interface a first parameter as an Uplink DPCCH Gating Capability parameter to define an Uplink DPCCH Gating capability for a local cell. Further parameters that can be sent through the Iub interface may include at least one of an Uplink DPCCH Gating Activation Indicator, a Gating Period, a Gating Burst Length, a Gating Preamble Length, a Gating Pattern Offset, and a Gating Power Offset.

A network device, such as the RNC 14, is constructed in accordance with the exemplary embodiments to include an NBAP and an RNSAP having a connection to an Iub interface and to an Iur interface, and in response to receiving an Uplink DPCCH Gating Capability parameter from the Iub interface, to send through the Iur interface an Uplink DPCCH Gating Support Indicator to define an Uplink DPCCH Gating capability for a local cell associated with an NBAP of at least one Node B coupled to the Iub interface. Further parameters that can be sent through the Iur interface may include at least one of an Uplink DPCCH Gating Activation Indicator, a Gating Period, a Gating Burst Length, a Gating Preamble Length, a Gating Pattern Offset, and a Gating Power Offset.

Various non-limiting, exemplary embodiments of the invention are further described below.

Figure 5:
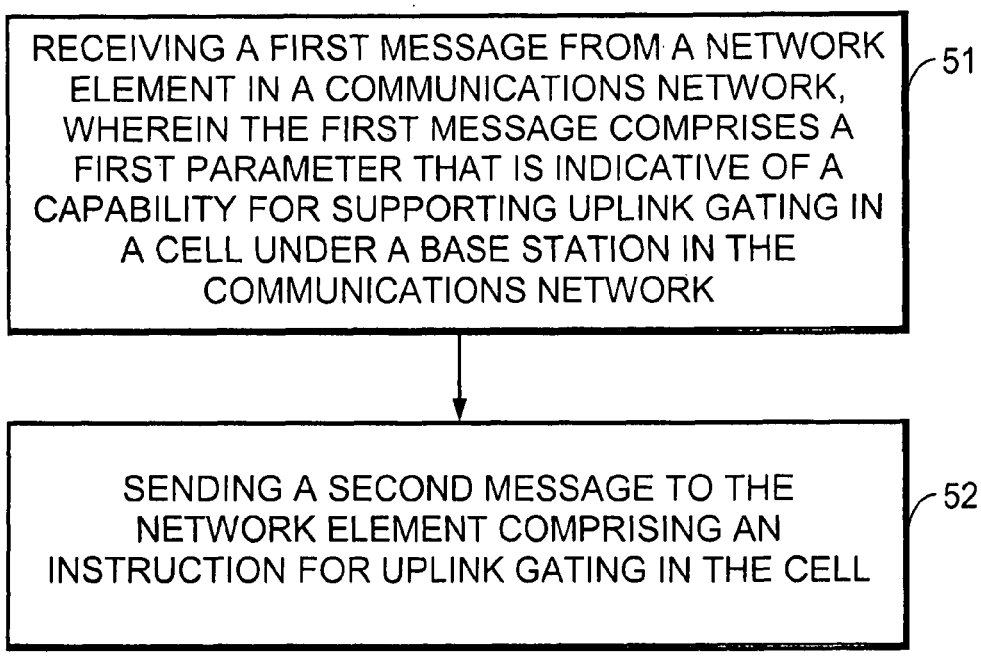
FIG. 5 depicts a flowchart illustrating another non-limiting example of a method for practicing the exemplary embodiments of this invention.

In an exemplary embodiment of the invention, and as shown in FIG. 5, a method includes: receiving a first message from a network element in a communications network, wherein the first message comprises a first parameter that is indicative of a capability for supporting uplink gating in a cell under a base station in the communications network (box 51); and sending a second message to the network element comprising an instruction for uplink gating in the cell (box 52).

A method as above, wherein the first message is received via an Iub interface or an Iur interface. A method as in any of the above, wherein the uplink gating comprises uplink dedicated physical control channel gating. A method as in any of the above, wherein the second message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. A method as in any of the above, wherein the first message comprises a cell capability container frequency division duplex information element comprising the first parameter. A method as in any of the above, wherein the method is performed by a serving radio network controller and wherein the communication network comprises a wideband code divisional multiple access network. A method as in any of the above, wherein the network element comprises the base station, a drifting radio network controller or a controlling radio network controller. A method as in any of the above, wherein the method is implemented by a computer program product comprising program instructions embodied on a tangible computer-readable medium, execution of the program instructions resulting in operations comprising the steps of the method. A method as in any of the above, wherein the method is implemented as a computer program.

In another exemplary embodiment of the invention, an electronic device comprises: a data processor configured to receive a first message from a network element in a communication network, wherein the first message comprises a first parameter that is indicative of a capability for supporting uplink gating in a cell under a base station in the communications network; and a memory configured to store the first parameter, wherein the data processor is further configured to send a second message to the network element, wherein the second message comprises an instruction for uplink gating in the cell.

An electronic device as above, wherein the first message is received by the data processor via an Iub interface or an Iur interface. An electronic device as in any of the above, wherein the uplink gating comprises uplink dedicated physical control channel gating. An electronic device as in any of the above, wherein the second message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. An electronic device as in any of the above, wherein the first message comprises a cell capability container frequency division duplex information element comprising the first parameter. An electronic device as in any of the above, wherein the network element comprises the base station, a drifting radio network controller or a controlling radio network controller. An electronic device as in any of the above, wherein the electronic device comprises a serving radio network controller and wherein the communication network comprises a wideband code divisional multiple access network.

In another exemplary embodiment of the invention, an electronic device comprises: means for receiving a first message from a network element in a communication network, wherein the first message comprises a first parameter that is indicative of a capability for supporting uplink gating in a cell under a base station in the communications network; and means for sending a second message to the network element, wherein the second message comprises an instruction for uplink gating in the cell.

An electronic device as above, wherein the first message is received by the means for receiving via an Iub interface or an Iur interface. An electronic device as in any of the above, wherein the uplink gating comprises uplink dedicated physical control channel gating. An electronic device as in any of the above, wherein the second message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. An electronic device as in any of the above, wherein the first message comprises a cell capability container frequency division duplex information element comprising the first parameter. An electronic device as in any of the above, wherein the means for receiving and the means for sending comprise a data processor coupled to a modem. An electronic device as in any of the above, wherein the network element comprises the base station, a drifting radio network controller or a controlling radio network controller. An electronic device as in any of the above, wherein the electronic device comprises a serving radio network controller and wherein the communication network comprises a wideband code divisional multiple access network.

In an exemplary embodiment of the invention, and as shown in FIG. 6, a method includes: determining a capability of a cell under a base station in a communications network to support uplink gating (box 61); and sending a message to a network element in the communications network, wherein the message comprises a first parameter comprising a positive or negative indication of the capability (box 62).

A method as above, wherein the message is sent via an Iub interface. A method as in any of the above, wherein the uplink gating comprises uplink dedicated physical control channel gating. A method as in any of the above, wherein the method is performed by the base station and wherein the communication network comprises a wideband code divisional multiple access network. A method as in any of the above, wherein the network element comprises a drifting radio network controller, a controlling radio network controller or a serving radio network controller. A method as in any of the above, further comprising receiving a second message comprising an instruction for uplink gating in the cell. A method as in any of the above, wherein the method is implemented by a computer program product comprising program instructions embodied on a tangible computer-readable medium, execution of the program instructions resulting in operations comprising the steps of the method. A method as in any of the above, wherein the method is implemented as a computer program.

In another exemplary embodiment of the invention, an electronic device comprises: a data processor configured to determine a capability of a cell under a base station in a communications network to support uplink gating; and a memory configured to store the first parameter, wherein the data processor is further configured to send a message to a network element in the communications network, wherein the message comprises a first parameter comprising a positive or negative indication of the capability.

An electronic device as above, wherein the message is sent by the data processor via an Iub interface. An electronic device as in any of the above, wherein the uplink gating comprises uplink dedicated physical control channel gating. An electronic device as in any of the above, wherein the network element comprises a drifting radio network controller, a controlling radio network controller or a serving radio network controller. An electronic device as in any of the above, wherein the electronic device comprises the base station and wherein the communication network comprises a wideband code divisional multiple access network. An electronic device as in any of the above, wherein the data processor is further configured to receive a second message comprising an instruction for uplink gating in the cell.

In another exemplary embodiment of the invention, an electronic device comprises: means for determining a capability of a cell under a base station in a communications network to support uplink gating; and means for sending a message to a network element in the communications network, wherein the message comprises a first parameter comprising a positive or negative indication of the capability.

An electronic device as above, wherein the message is sent by the means for sending via an Iub interface. An electronic device as in any of the above, wherein the uplink gating comprises uplink dedicated physical control channel gating. An electronic device as in any of the above, wherein the means for receiving and the means for sending comprise a data processor coupled to a modem. An electronic device as in any of the above, wherein the network element comprises a drifting radio network controller, a controlling radio network controller or a serving radio network controller. An electronic device as in any of the above, wherein the electronic device comprises the base station and wherein the communication network comprises a wideband code divisional multiple access network. An electronic device as in any of the above, further comprising means for receiving a second message comprising an instruction for uplink gating in the cell.

Figure 7:
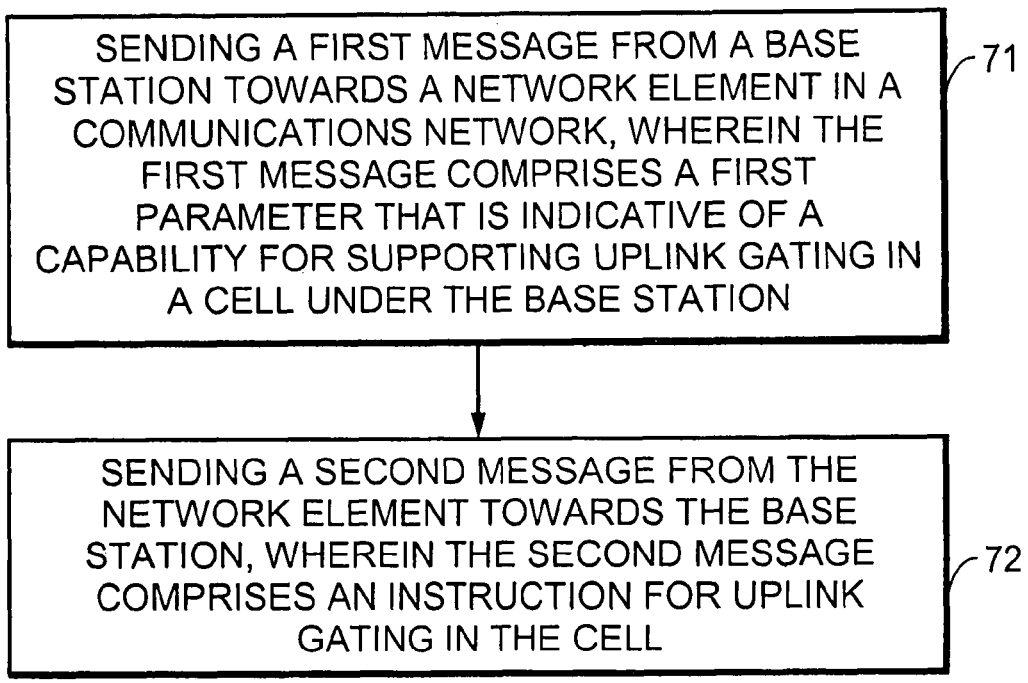
FIG. 7 depicts a flowchart illustrating another non-limiting example of a method for practicing the exemplary embodiments of this invention.

In an exemplary embodiment of the invention, and as shown in FIG. 7, a method includes: sending a first message from a base station towards a network element in a communications network, wherein the first message comprises a first parameter that is indicative of a capability for supporting uplink gating in a cell under the base station (box 71); and sending a second message from the network element towards the base station, wherein the second message comprises an instruction for uplink gating in the cell (box 72).

A method as above, wherein the network element comprises a second network element, wherein sending the first message comprises sending the first message from the base station to a first network element, wherein sending the second message comprises sending the second message from the second network element to the first network element, the method further comprising: sending a third message from the first network element to the second network element, wherein the third message comprises the first parameter; and sending a fourth message from the first network element to the base station, wherein the fourth message comprises the instruction for uplink gating in the cell. A method as in any of the above, wherein the first network element comprises a drifting radio network controller or a controlling radio network controller, wherein the second network element comprises a serving radio network controller, wherein the communications network comprises a wideband code divisional multiple access network. A method as in any of the above, wherein the second message is sent in response to the second network element receiving a positive indication of the capability for supporting uplink gating in the cell. A method as in any of the above, wherein the second message is sent via an Iub interface or an Iur interface. A method as in any of the above, wherein the uplink gating comprises uplink dedicated physical control channel gating. A method as in any of the above, wherein the second message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. A method as in any of the above, wherein the first message comprises a cell capability container frequency division duplex information element comprising the first parameter. A method as in any of the above, wherein the communications network comprises a wideband code divisional multiple access network. A method as in any of the above, wherein the network element comprises a drifting radio network controller, a controlling radio network controller or a serving radio network controller. A method as in any of the above, wherein the method is implemented by a computer program product comprising program instructions embodied on a tangible computer-readable medium, execution of the program instructions resulting in operations comprising the steps of the method. A method as in any of the above, wherein the method is implemented as a computer program.

In another exemplary embodiment of the invention, an electronic device comprises: a network element; and a base station configured to send towards the network element a first message comprising a first parameter that is indicative of a capability for supporting uplink gating in a cell under the base station, wherein the network element is configured to send towards the base station a second message comprising an instruction for uplink gating in the cell.

An electronic device as above, wherein the network element comprises a second network element, the communications network further comprising a first network element, wherein the first message is sent from the base station to the first network element, wherein the second message is sent from the second network element to the first network element, wherein the first network element is configured to send to the second network element a third message comprising the first parameter and to send to the base station a fourth message comprising the instruction for uplink gating in the cell. An electronic device as in any of the above, wherein the first network element comprises a drifting radio network controller or a controlling radio network controller, wherein the second network element comprises a serving radio network controller, wherein the communications network comprises a wideband code divisional multiple access network. An electronic device as in any of the above, wherein the second message is sent via an Iub interface or an Iur interface. An electronic device as in any of the above, wherein the uplink gating comprises uplink dedicated physical control channel gating. An electronic device as in any of the above, wherein the second message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. An electronic device as in any of the above, wherein the first message comprises a cell capability container frequency division duplex information element comprising the first parameter. An electronic device as in any of the above, wherein the base station is further configured to determine the capability of the cell to support uplink gating. An electronic device as in any of the above, wherein the communications network comprises a wideband code divisional multiple access network.

Figure 8:
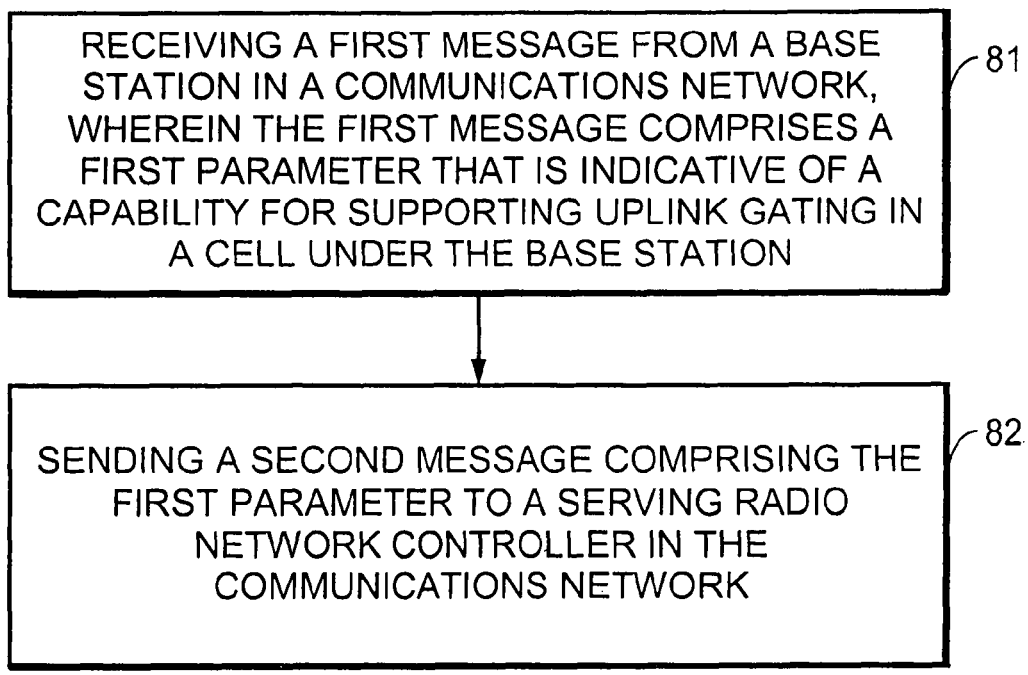
FIG. 8 depicts a flowchart illustrating another non-limiting example of a method for practicing the exemplary embodiments of this invention.

In an exemplary embodiment of the invention, and as shown in FIG. 8, a method includes: receiving a first message from a base station in a communications network, wherein the first message comprises a first parameter that is indicative of a capability for supporting uplink gating in a cell under the base station (box 81); and sending a second message comprising the first parameter to a serving radio network controller in the communications network (box 82).

A method as above, wherein the first message is received via an Iub interface and wherein the second message is sent via an Iur interface. A method as in any of the above, wherein the uplink gating comprises uplink dedicated physical control channel gating. A method as in any of the above, wherein the second message comprises a cell capability container frequency division duplex information element comprising the first parameter. A method as in any of the above, further comprising: receiving a third message from the serving radio network controller, wherein the third message comprises an instruction for uplink gating in the cell; and sending a fourth message comprising the instruction to the base station. A method as in the above, wherein the third message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. A method as in any of the above, wherein the method is performed by a controlling radio network controller and wherein the communications network comprises a wideband code divisional multiple access network. A method as in any of the above, wherein the method is implemented by a computer program product comprising program instructions embodied on a tangible computer-readable medium, execution of the program instructions resulting in operations comprising the steps of the method. A method as in any of the above, wherein the method is implemented as a computer program.

In another exemplary embodiment of the invention, an electronic device comprises: a data processor configured to receive a first message from a base station in a communications network, wherein the first message comprises a first parameter that is indicative of a capability for supporting uplink gating in a cell under the base station; and a memory configured to store the first parameter, wherein the data processor is further configured to send a second message comprising the first parameter to a serving radio network controller.

An electronic device as above, wherein the first message is received by the data processor via an Iub interface and wherein the second message is sent by the data processor via an Iur interface. An electronic device as in any of the above, wherein the uplink gating comprises uplink dedicated physical control channel gating. An electronic device as in any of the above, wherein the second message comprises a cell capability container frequency division duplex information element comprising the first parameter. An electronic device as in any of the above, wherein the data processor is further configured to receive a third message from the serving radio network controller, wherein the third message comprises an instruction for uplink gating in the cell and to send a fourth message comprising the instruction to the base station. An electronic device as in the above, wherein the third message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. An electronic device as in any of the above, wherein the electronic device comprises a drifting radio network controller or a controlling radio network controller and wherein the communications network comprises a wideband code divisional multiple access network.

In another exemplary embodiment of the invention, an electronic device comprises: means for receiving a first message from a base station in a communications network, wherein the first message comprises a first parameter that is indicative of a capability for supporting uplink gating in a cell under the base station; and means for sending a second message comprising the first parameter to a serving radio network controller.

An electronic device as above, wherein the first message is received by the means for receiving via an Iub interface and wherein the second message is sent by the means for sending via an Iur interface. An electronic device as in any of the above, wherein the uplink gating comprises uplink dedicated physical control channel gating. An electronic device as in any of the above, wherein the second message comprises a cell capability container frequency division duplex information element comprising the first parameter. An electronic device as in any of the above, further comprising: means for receiving a third message from the serving radio network controller and means for sending a fourth message to the base station, wherein the third message comprises an instruction for uplink gating in the cell, wherein the fourth message comprises the instruction. An electronic device as in the above, wherein the third message comprises at least one of: a second parameter indicating that the uplink gating is activated or deactivated, a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, a sixth parameter indicating an offset of a start-point of a gating pattern as compared to a starting point of a radio frame, and a seventh parameter indicating a gating power offset relative to a last transmitted slot before a gap and to be used for a first transmitted slot after the gap. An electronic device as in any of the above, wherein the means for receiving and the means for sending comprise a data processor coupled to a modem. An electronic device as in any of the above, wherein the electronic device comprises a drifting radio network controller or a controlling radio network controller and wherein the communications network comprises a wideband code divisional multiple access network.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

While the exemplary embodiments have been described above in the context of the WCDMA system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Programs, such as those provided by Synopsys, Inc. of Mountain View, Calif. and Cadence Design, of San Jose, Calif. can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication as one or more integrated circuit devices.

The foregoing description has provided by way of exemplary and non-limiting examples a full and informative description of the invention. Various modifications and adaptations to the foregoing exemplary embodiments of this invention may become apparent to those skilled in the relevant arts in view of the foregoing description, when read in conjunction with the accompanying drawings and the appended claims. For example, other IE names could be used, other messages and/or message names could be used, and more or fewer parameters could be included. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, by a serving radio network controller, a first message from a network element in a communication network, wherein the first message comprises a first parameter that is indicative of whether or not uplink gating is supported by a cell under a base station in the communication network, wherein the communication network comprises a wideband code divisional multiple access network, wherein the network element comprises one of the base station, a drifting radio network controller and a controlling radio network controller; and
   sending a second message from the serving radio network controller to the network element comprising an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

2. The method as in claim 1, wherein the first message is received via an Iub interface or an Iur interface.

3. The method as in claim 1, wherein the uplink gating comprises uplink dedicated physical control channel gating.

4. The method as in claim 1, wherein the second message comprises the third parameter, the fourth parameter, the fifth parameter and the sixth parameter.

5. An apparatus comprising:
   a processor; and
   a memory including program instructions, the memory and the program instructions being configured to, with the processor, cause the apparatus at least to perform:
   receiving a first message from a network element in a communication network, wherein the first message comprises a first parameter that is indicative of whether or not uplink gating is supported by a cell under a base station in the communication network, wherein the communication network comprises a wideband code divisional multiple access network, wherein the apparatus comprises a serving radio network controller, wherein the network element comprises one of the base station, a drifting radio network controller and a controlling radio network controller; and
   sending a second message to the network element, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

6. The apparatus as in claim 5, wherein the first message is received by the apparatus via an Iub interface or an Iur interface.

7. The apparatus as in claim 5, wherein the uplink gating comprises uplink dedicated physical control channel gating.

8. The apparatus as in claim 5, wherein the second message comprises the third parameter, the fourth parameter, the fifth parameter and the sixth parameter.

9. An apparatus comprising:
   means for receiving a first message from a network element in a communication network, wherein the first message comprises a first parameter that is indicative of whether or not uplink gating is supported by a cell under a base station in the communication network, wherein the communication network comprises a wideband code divisional multiple access network, wherein the apparatus comprises a serving radio network controller, wherein the network element comprises one of the base station, a drifting radio network controller and a controlling radio network controller; and means for sending a second message to the network element, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

10. The apparatus as in claim 9, wherein the first message is received by the apparatus via an Iub interface or an Iur interface.

11. The apparatus as in claim 9, wherein the second message comprises the third parameter, the fourth parameter, the fifth parameter and the sixth parameter.

12. The apparatus as in claim 9, wherein the means for receiving and the means for sending comprise a data processor coupled to a transceiver.

13. A method comprising:

sending a first message from a base station towards a network element in a communication network, wherein the first message comprises a first parameter that is indicative of whether or not uplink gating is supported by a cell under the base station, wherein the communication network comprises a wideband code divisional multiple access network, wherein the network element comprises one of a drifting radio network controller and a controlling radio network controller; and sending a second message from the network element towards the base station, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

14. The method as in claim 13, wherein the network element comprises a second network element, wherein sending the first message comprises sending the first message from the base station to a first network element, wherein sending the second message comprises sending the second message from the second network element to the first network element, the method further comprising:

sending a third message from the first network element to the second network element, wherein the third message comprises the first parameter; and sending a fourth message from the first network element to the base station, wherein the fourth message comprises the instruction for uplink gating in the cell.

15. The method as in claim 13, wherein the method is implemented by a computer program product comprising program instructions embodied on a non-transitory, tangible computer-readable medium, execution of the program instructions resulting in operations comprising the steps of the method.

16. The method as in claim 13, wherein the second message comprises the third parameter, the fourth parameter, the fifth parameter and the sixth parameter.

17. A communications network comprising:

a network element; and a base station configured to send towards the network element a first message comprising a first parameter that is indicative of whether or not uplink gating is supported by a cell under the base station, wherein the network element is configured to send towards the base station a second message comprising an instruction for uplink gating in the cell, wherein the communications network comprises a wideband code divisional multiple access network, wherein the network element comprises one of a drifting radio network controller and a controlling radio network controller, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

18. The communications network as in claim 17, wherein the network element comprises a second network element, the communications network further comprising a first network element, wherein the first message is sent from the base station to the first network element, wherein the second message is sent from the second network element to the first network element, wherein the first network element is configured to send to the second network element a third message comprising the first parameter and to send to the base station a fourth message comprising the instruction for uplink gating in the cell.

19. The communications network as in claim 17, wherein the second message further comprises a seventh parameter indicating a gating power offset relative to a last transmitted slot before a gap and to be used for a first transmitted slot after the gap.

20. The communications network as in claim 17, wherein the second message comprises the third parameter, the fourth parameter, the fifth parameter and the sixth parameter.

21. A non-transitory computer-readable medium tangibly embodying program instructions, execution of the program instructions by an apparatus resulting in operations comprising:

receiving, by a serving radio network controller, a first message from a network element in a communication network, wherein the first message comprises a first parameter that is indicative of whether or not uplink gating is supported by a cell under a base station in the communication network, wherein the communication network comprises a wideband code divisional multiple access network, wherein the network element comprises one of the base station, a drifting radio network controller and a controlling radio network controller; and sending a second message from the serving radio network controller to the network element, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

22. The computer-readable medium as in claim 21, wherein the first message is received via an Iub interface or an Iur interface.

23. The computer-readable medium as in claim 21, wherein the uplink gating comprises uplink dedicated physical control channel gating.

24. The computer-readable medium as in claim 21, wherein the second message comprises the third parameter, the fourth parameter, the fifth parameter and the sixth parameter.

25. A method comprising:
sending a first message from a network element to a serving radio network controller in a communication network, wherein the first message comprises a first parameter that is indicative of whether or not uplink gating is supported by a cell under a base station in the communication network, wherein the communication network comprises a wideband code divisional multiple access network, wherein the network element comprises one of the base station, a drifting radio network controller and a controlling radio network controller; and
receiving, by the network element, a second message from the serving radio network controller, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

26. The method as in claim 25, wherein the first message is received via an Iub interface or an Iur interface.

27. The method as in claim 25, wherein the uplink gating comprises uplink dedicated physical control channel gating.

28. The method as in claim 25, wherein the method is implemented by a computer program product comprising program instructions embodied on a non-transitory, tangible computer-readable medium, execution of the program instructions resulting in operations comprising the steps of the method.

29. The method as in claim 25, wherein the second message comprises the third parameter, the fourth parameter, the fifth parameter and the sixth parameter.

30. An apparatus comprising:
a processor; and
a memory including program instructions, the memory and the program instructions being configured to, with the processor, cause the apparatus at least to perform:
sending a first message to a serving radio network controller in a communication network, wherein the first message comprises a first parameter that is indicative of whether or not uplink gating is supported by a cell under a base station in the communication network, wherein the communication network comprises a wideband code divisional multiple access network, wherein the apparatus comprises one of the base station, a drifting radio network controller and a controlling radio network controller; and
receiving a second message from the serving radio network controller, wherein the second message comprises an instruction for uplink gating in the cell, wherein the second message comprises a second parameter indicating that the uplink gating is activated or deactivated, wherein the second message further comprises at least one of: a third parameter indicating a length of a gating pattern for the uplink gating, a fourth parameter indicating a length of a burst in a gating pattern for the uplink gating, a fifth parameter indicating a length of a preamble to be transmitted after a transmission gap and before data transmission, and a sixth parameter indicating an offset of a start-point of a gating pattern as compared to a starting point of a radio frame.

31. The apparatus as in claim 30, wherein the first message is received by the apparatus via an Iub interface or an Iur interface.

32. The apparatus as in claim 30, wherein the uplink gating comprises uplink dedicated physical control channel gating.

33. The apparatus as in claim 30, wherein the second message comprises the third parameter, the fourth parameter, the fifth parameter and the sixth parameter.

* * * * *